United States Patent
Schoenfelder

(10) Patent No.: US 10,676,063 B2
(45) Date of Patent: Jun. 9, 2020

(54) INTEGRATED AIR JACK FOR SNOWMOBILE

(71) Applicant: Black Diamond Xtreme Engineering, Inc., Cannon Falls, MN (US)

(72) Inventor: Ray Schoenfelder, Cannon Falls, MN (US)

(73) Assignee: BLACK DIAMOND XTREME ENGINEERING, INC., Cannon Falls, MN (US)

( * ) Notice: Subject to any disclaimer, the term of this patent is extended or adjusted under 35 U.S.C. 154(b) by 0 days.

(21) Appl. No.: 16/430,878

(22) Filed: Jun. 4, 2019

(65) Prior Publication Data

US 2019/0366973 A1    Dec. 5, 2019

Related U.S. Application Data

(60) Provisional application No. 62/680,150, filed on Jun. 4, 2018.

(51) Int. Cl.
*B66F 3/24* (2006.01)
*B60R 21/36* (2011.01)
*B62M 27/02* (2006.01)

(52) U.S. Cl.
CPC .............. *B60R 21/36* (2013.01); *B62M 27/02* (2013.01); *B66F 3/247* (2013.01)

(58) Field of Classification Search
CPC ................. B66F 3/00; B66F 3/35; B66F 3/24
See application file for complete search history.

(56) References Cited

U.S. PATENT DOCUMENTS

| | | | | |
|---|---|---|---|---|
| 3,843,092 A * | 10/1974 | Oehler | ...................... | B60P 1/02 254/93 HP |
| 4,560,145 A * | 12/1985 | Widmer | .................. | F15B 15/10 254/93 HP |
| 6,082,708 A * | 7/2000 | Mullican | ................... | B66F 3/35 254/93 HP |
| 6,513,418 B1 * | 2/2003 | Simmons | .............. | F15B 15/103 254/93 HP |

\* cited by examiner

*Primary Examiner* — Lee D Wilson
(74) *Attorney, Agent, or Firm* — Westman, Champlin & Koehler, P.A.; Z. Peter Sawicki; Amanda M. Prose

(57) ABSTRACT

An integrated air jack assembly for a snowmobile for generally lifting the snowmobile from a stuck position to a free position. The assembly including a pair of airbags positioned on an underside of a chassis and coupled to an air source for inflation. In the preferred configuration of the device, the air source is a jet powered fan configured to inflate a first airbag and a second airbag for raising an underside of a chassis of the snowmobile.

15 Claims, 3 Drawing Sheets

INTEGRATED AIR JACK FOR SNOWMOBILE

CROSS REFERENCE TO RELATED APPLICATIONS

This application claims priority to U.S. Provisional Patent Application No. 62/680,150 filed Jun. 4, 2018 to the above named inventor and is herein incorporated by reference in its entirety.

FIELD OF THE INVENTION

The invention relates generally to an assembly configured to lift a snowmobile from a stuck position through a jacking device.

BACKGROUND

In the course of operating a snowmobile or snow vehicle, particularly in deep snow, occasionally the snowmobile will become stuck. Typically, the snowmobile becomes stuck on the running boards, wherein the suspension is generally at its maximum extended position and unable to engage a suitable surface to generate traction.

To remedy this situation, often the user must dig out the snowmobile a significant distance to clear the running boards and free the snowmobile from the stuck condition.

Therefore, there is a need for an improved system and assembly that is generally configured to lift a snowmobile from a stuck condition in a semi-automated assembly. Preferably, this assembly is configured for multiple uses and configured for placement on a snowmobile as an aftermarket assembly or integrated as a component on a new snowmobile.

SUMMARY OF THE INVENTION

The system and device assembly of the present disclosure is generally configured to raise the height of a snowmobile relative to a ground surface. Accordingly, the device is generally configured to jack up the snowmobile to free it from a stuck position.

The device of the present disclosure is generally comprised of an air source to inflate an airbag positioned on the snowmobile.

In a preferred assembly the device of the present disclosure is generally comprised of a power source, an air source, an airbag, a trigger means, and a containment means for the airbag in a collapsed condition.

The airbag of the present disclosure is inflatable from the collapsed condition to an extended position, wherein the airbag is generally positioned on an underside of the running board portion of a chassis of the snowmobile for generally raising the snowmobile height to free it from a stuck condition.

The air source of the present disclosure is generally provided in a pneumatic coupling with the airbag and an electric coupling with the power source. The air source is preferably a jet-fan configured to move a large volume of air in a short period of time for generally inflating the airbag. In an alternate embodiment, the air source may be any device that is generally configured to move a large volume of air quickly, including, but not limited to, an air canister, a pressurized air canister, an air cylinder, a blower, and other similar devices.

The airbag generally forming a collapsible/extensible enclosure for selectively retaining air. The airbag generally having a surface area and comprising an upper portion and a lower portion. Preferably, the lower portion is dimensioned with an area greater than the upper portion, wherein the airbag is generally shaped to lift the snowmobile the airbag is used on. In the preferred assembly of the airbag, the lower portion is further encapsulated within the containment means on the lower portion of the running board.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWING(S)

DETAILED DESCRIPTION OF THE INVENTION

Figure 1:
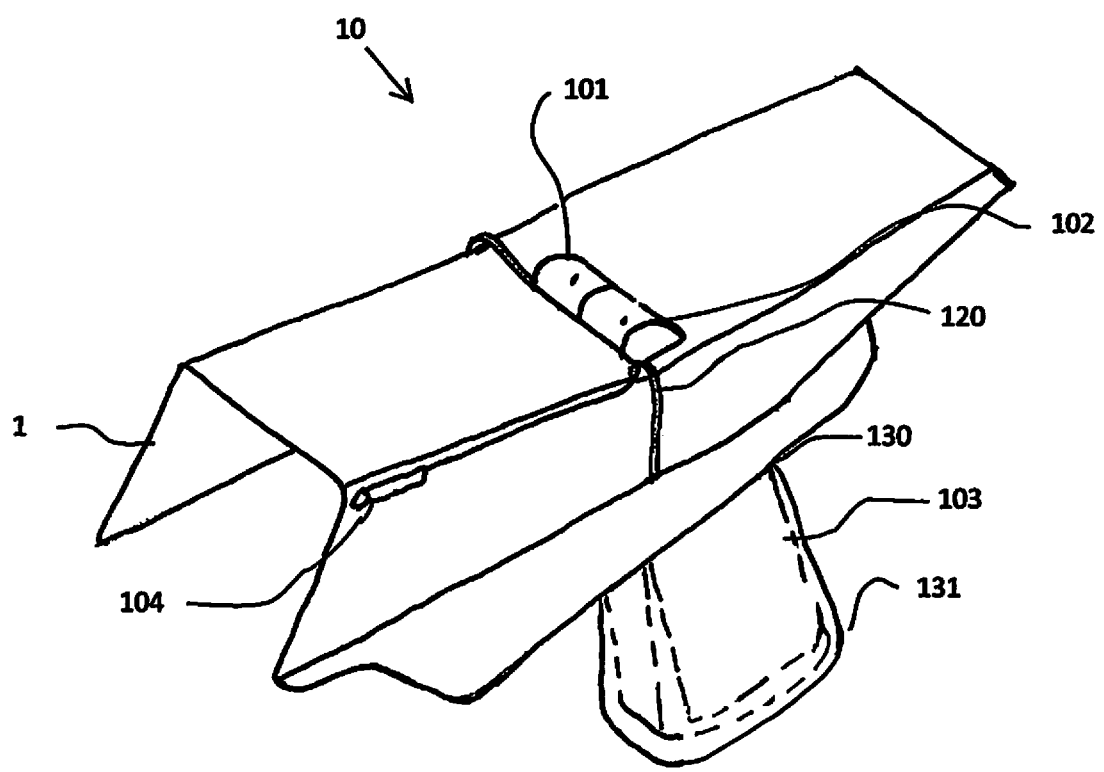
FIG. 1 is an isometric view of the assembly, according to the present disclosure.

The following detailed description includes references to the accompanying tables and figures, which form a part of the detailed description. The tables and figures show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the term "coupled" means the joining of two members directly or indirectly to one another. Such joining may be stationary in nature or movable in nature and/or such joining may allow for the flow of fluids, air, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The system and device assembly of the present disclosure is generally configured to provide a jacking device for placement on a snowmobile for generally lifting the vehicle from a stuck position to a freed position through the use of an airbag device.

Figure 2:
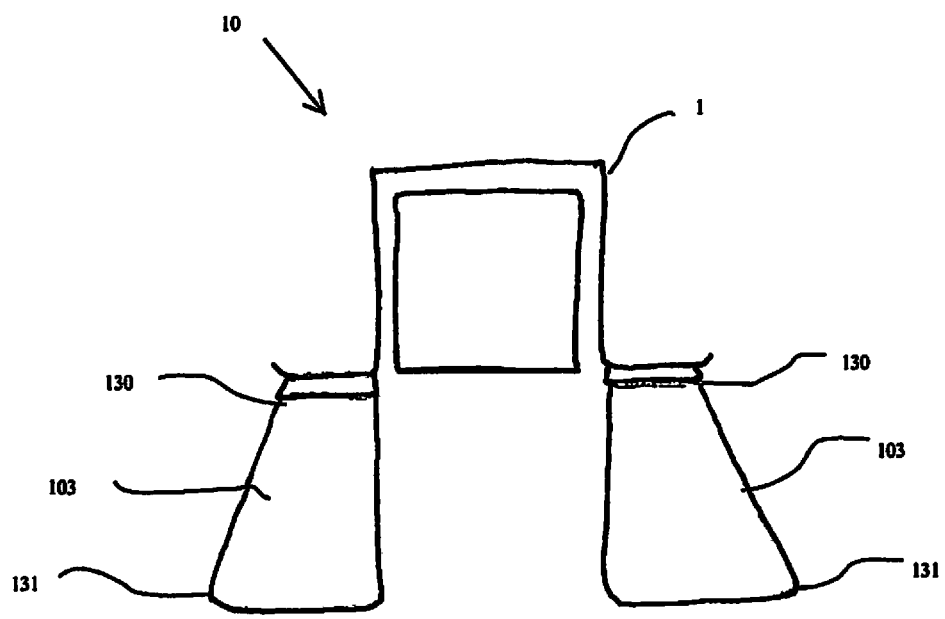
FIG. 2 is a front side view of the assembly, according to the present disclosure.
Figure 3:
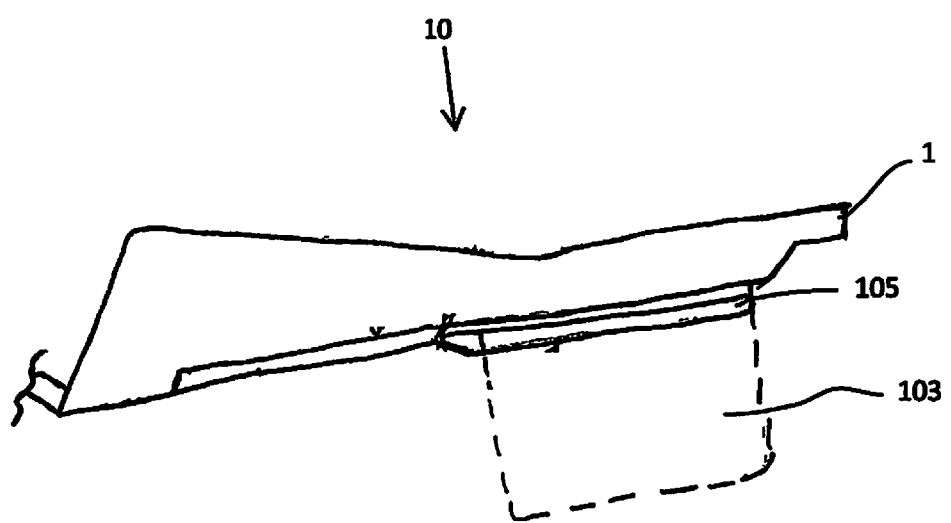
FIG. 3 is a side view of the assembly, according to the present disclosure.

Referring now to FIGS. 1-3 of the integrated air jack for a snowmobile of the present disclosure, generally referred to as device 10. The system and device 10 assembly of the present disclosure is generally configured to raise the height of a snowmobile vehicle, particularly a chassis 1 of the vehicle, relative to a ground surface. Accordingly, the device 10 is generally configured to jack up the snowmobile to free it from a stuck position through the use of an inflated airbag 103.

The device 10 of the present disclosure is generally comprised of a power source 101, an air source 102, the airbag 103, a trigger means 104, and a containment means 105 for the airbag 103 in a collapsed condition.

The power source 101 of the device 10 generally providing power to the air source 102 upon activation of the trigger means 104. The power source 101 preferably a removable battery, such as a Lithium-Ion battery, providing a direct current to the air source 102. Alternately, the power source 101, may be the power source of the vehicle, wherein the power source 101 is in a direct coupling with the existing snowmobile power source.

The air source 102 is coupled to the power source 101 and trigger means 104 and configured to move air to the airbag 103 through a pneumatic coupling with an airline 120 upon activation of the trigger means 104. The air source 102 configured to move a large volume of air into the airbag 103 through a blower means. Preferably, the air source 102 is a jet-fan configured to generate and distribute a large volume of air quickly into the airbag 103.

In an alternate embodiment, the air source 102 may be any device that is generally configured to move a large volume of air quickly, including, but not limited to, an air canister, a pressurized air canister, an air cylinder, a blower, and other similar devices. Accordingly, these alternate air sources 102 may not require a power source 101 for activation.

The airbag 103 of the present disclosure is generally coupled to the air source 102 through the airline 120 and comprised of a flexible and resilient material, such as a woven nylon-based fabric, and movable through inflation from the collapsed condition to an extended position. The airbag 103 is positioned at an underside of a running board and retained by the containment means 105 along the chassis 1, wherein in the extended position, the airbag 103 is configured for supporting the chassis 1 and lifting the weight of the snowmobile the device 10 is placed upon.

The airbag 103 generally forming a collapsible/extensible enclosure for selectively retaining air. The airbag 103 generally having a surface area and comprising an upper portion 130 and a lower portion 131 opposite the upper portion 130. Preferably, the lower portion 131 is dimensioned with an area greater than the upper portion 130, wherein the airbag 103 is generally trapezoidal in shape to lift the snowmobile the device 10 is placed upon.

In the preferred assembly of the airbag 103, the lower portion 131 is further encapsulated within the containment means 105 on the lower portion of the running board. The containment means 105 generally integrated into the structure of the running board underside and configured with an assembly to lock or snap the airbag 103 into place in the collapsed position until needed.

In the preferred assembly, the device 10 is configured with a pair of airbags 103 positioned on opposed sides of the chassis 1 along the running boards, wherein the airbags 103 are inflated simultaneously to generally lift the vehicle. Alternately, the trigger means 104 may be configured to operate only a single airbag 103 of the pair of airbags 103.

In the preferred assembly of the device 10, the airbags are generally configured to extend a height of eighteen (18) inches between the upper portion 130 and the lower portion 131, a width of twelve (12) inches at the lower portion 131, and a length of sixteen (16) inches at the lower portion 131.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A jacking device for placement on a chassis of a snowmobile, the device comprising:
    a first airbag positioned at a lower portion of a running board on the chassis and movable from a collapsed position to an extended position;
    a second airbag positioned at a lower portion of a running board on the chassis on an opposed side of the first airbag and movable from a collapsed position to an extend position;
    an air source coupled to the first airbag and the second airbag, the air source configured to inflate the first airbag and the second airbag to the extended position, wherein the air source is a jet-fan.

2. A device as in claim 1, wherein the first airbag and the second airbag have a surface area comprising an upper portion and a lower portion opposite the upper portion, with the lower portion having a dimensioned area greater than the upper portion.

3. A device as in claim 2, wherein the first airbag and the second airbag are trapezoidal in shape.

4. A device as in claim 1, wherein the device includes a power source, the power source coupled to the air source.

5. A device for placement on a chassis of a snowmobile, the device configured to lift the chassis to remove the snowmobile from a stuck condition, the device comprising:
    a first airbag positioned at a lower portion of a running board on the chassis and movable from a collapsed position to an extended position;
    a second airbag positioned at a lower portion of a running board on the chassis on an opposed side of the first airbag and movable from a collapsed position to an extend position;
    a jet fan coupled to the first airbag and the second airbag, the jet fan configured to inflate the first airbag and the second airbag to the extended position; and
    a power source, the power source coupled to the jet fan.

6. A device as in claim 5, wherein the first airbag and the second airbag have a surface area comprising an upper portion and a lower portion opposite the upper portion, with the lower portion having a dimensioned area greater than the upper portion.

7. A device as in claim 6, wherein the first airbag and the second airbag are trapezoidal in shape.

8. A device as in claim 5, wherein the device includes a trigger mechanism, the trigger mechanism coupled to the air source, wherein activation of the trigger mechanism inflates the first airbag and the second airbag.

9. A device as in claim 8, wherein the trigger mechanism can activate only the first airbag or the second airbag.

10. A device as in claim 5, wherein the power source is the vehicle power source.

11. A device as in claim 5, wherein the power source is a battery.

12. A device for placement on a chassis of a snowmobile, the device configured to lift the chassis to remove the snowmobile from a stuck condition, the device comprising:
    a first airbag positioned at a lower portion of a running board on the chassis and movable from a collapsed position to an extended position;
    a second airbag positioned at a lower portion of a running board on the chassis on an opposed side of the first airbag and movable from a collapsed position to an extend position;
    containment means, the containment means configured to retain the first airbag and the second airbag in the collapsed position;
    a jet fan coupled to the first airbag and the second airbag, the jet fan configured to inflate the first airbag and the second airbag to the extended position;
    a power source, the power source coupled to the jet fan; and
    a trigger mechanism, the trigger mechanism coupled to the power source and the jet fan, wherein activation of the trigger mechanism selectively inflates the first airbag and the second airbag.

13. A device as in claim 12, wherein the first airbag and the second airbag have a surface area comprising an upper portion and a lower portion opposite the upper portion, with the lower portion having a dimensioned area greater than the upper portion.

14. A device as in claim 12, wherein the trigger mechanism can activate only the first airbag or the second airbag.

15. A device as in claim 12, wherein the power source is the vehicle power source.

* * * * *